US007962163B2

(12) United States Patent
Tsuchiyama (10) Patent No.: US 7,962,163 B2
(45) Date of Patent: Jun. 14, 2011

(54) BROADCAST RECEIVING SYSTEM, BROADCAST RECEIVING METHOD, RELAY APPARATUS, MOBILE STATION, AND CONTROL PROGRAM THEREFOR

(75) Inventor: Kenji Tsuchiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 974 days.

(21) Appl. No.: 11/477,622

(22) Filed: Jun. 30, 2006

(65) Prior Publication Data
US 2007/0004334 A1   Jan. 4, 2007

(30) Foreign Application Priority Data

Jul. 1, 2005   (JP) .................................. 2005-193341

(51) Int. Cl.
*H04M 3/42*   (2006.01)
*H04M 1/725*   (2006.01)
*H04M 11/04*   (2006.01)
*H04B 7/15*   (2006.01)
*H04B 7/185*   (2006.01)
*H04W 24/00*   (2009.01)

(52) U.S. Cl. ................... 455/504; 455/404.1; 455/13.1; 455/11.1; 455/507; 455/404.2; 455/414.1; 455/412.1; 455/412.2; 455/456.5; 455/466

(58) Field of Classification Search ............... 455/404.1, 455/13.1, 11.1, 507, 404.2, 414.1, 412.1, 455/412.2, 456.5, 466
See application file for complete search history.

(56) References Cited

U.S. PATENT DOCUMENTS

| 6,115,605 | A  | * | 9/2000 | Siccardo et al. | ........... 455/426.1 |
|---|---|---|---|---|---|
| 6,909,902 | B1 | * | 6/2005 | Sawada et al. | ............. 455/456.1 |
| 7,054,612 | B2 | * | 5/2006 | Patel | ......................... 455/404.1 |
| 7,092,434 | B2 | * | 8/2006 | Moon et al. | .................... 375/211 |
| 7,532,601 | B2 | * | 5/2009 | Kayama et al. | ............... 370/335 |
| 2002/0028655 | A1 | * | 3/2002 | Rosener et al. | ................. 455/16 |
| 2004/0203562 | A1 | * | 10/2004 | Kolsrud | ..................... 455/404.1 |
| 2004/0242213 | A1 | * | 12/2004 | Benco et al. | .................... 455/415 |
| 2004/0259540 | A1 | * | 12/2004 | Banerjee et al. | ............. 455/425 |
| 2004/0259568 | A1 |  | 12/2004 | Patel |  |
| 2006/0009191 | A1 | * | 1/2006 | Malone, III | ................ 455/404.1 |
| 2006/0154643 | A1 | * | 7/2006 | Scholz | ........................ 455/404.2 |
| 2006/0293024 | A1 | * | 12/2006 | Benco et al. | ............... 455/404.2 |
| 2008/0143590 | A1 | * | 6/2008 | McBurney et al. | ........ 342/357.1 |

FOREIGN PATENT DOCUMENTS

| JP | 2003-018673 A | 1/2003 |
|---|---|---|
| JP | 2003-153111 | 5/2003 |
| JP | 2003-324361 A | 11/2003 |
| JP | 2004-336227 | 11/2004 |
| JP | 2005-51602 | 2/2005 |
| JP | 2005-117584 | 4/2005 |

* cited by examiner

*Primary Examiner* — Lewis G West
*Assistant Examiner* — Bobbak Safaipour
(74) *Attorney, Agent, or Firm* — Dickstein Shapiro LLP (57) ABSTRACT

A broadcast receiving system capable of keeping low the power consumption of a mobile station having a broadcast receiving unit for receiving an irregular broadcast is realized. A broadcast station transmits a broadcast notice for notifying that predefined contents will be broadcasted. The broadcast notice is transmitted to the mobile station through a relay apparatus and a mobile basestation. The mobile station receives the broadcast notice from the mobile basestation by a communication channel commonly used by mobile stations in the mobile coverage. The mobile station is set to a state capable of receiving the broadcast.

8 Claims, 10 Drawing Sheets

| CHANNEL | BROADCAST START TIME | BROADCAST END TIME | EMERGENCY TYPE | EMERGENCY LOCATION |
|---------|---------------------|--------------------|----------------|--------------------|

EMERGENCY BROADCAST NOTICE (EBN) FRAME FORMAT

BROADCAST RECEIVING SYSTEM, BROADCAST RECEIVING METHOD, RELAY APPARATUS, MOBILE STATION, AND CONTROL PROGRAM THEREFOR

BACKGROUND OF THE INVENTION

1. Field of the Invention

The present invention relates to a broadcast receiving system for receiving a broadcast, and more particularly, to a broadcast receiving system capable of receiving an irregular broadcast such as a special newscast while keeping usual power consumption low. The present invention also relates to a relay apparatus and a mobile station that are used in the broadcast receiving system, a program for controlling the broadcast receiving system, and a broadcast receiving method.

2. Description of the Related Art

Mobile stations capable of receiving television, radio, and other broadcasts have come into wide use in recent years. Mobile stations are predicted to serve in future one of means for receiving broadcasts including emergency information from digital terrestrial broadcasting (hereinafter abbreviated as DTB). For instance, DTB can be used as away to deliver emergency alert information to a user of the mobile station when a disaster strikes an area where the user is. The emergency information can be displayed on a display screen of the mobile station among other received broadcast contents if the mobile station is always in a state capable of receiving DTB.

This emergency alert broadcast receiving method requires the user to keep a DTB receiving unit, as well as a display unit, of the mobile station turned on in order to obtain emergency information from DTB.

Keeping the DTB receiving unit and the display unit turned on irrespective of whether there is an emergency such as disaster or not increases power consumption of the mobile station. The mobile station accordingly has less standby time, talk time and data communication time.

To solve this problem, such a mobile station has been proposed that is always ready to receive emergency alert signals but not other signals and enters a state capable of receiving and displaying DTB when emergency alert signals are received, instead of maintaining the state of receiving and displaying DTB all the time. This type of mobile station keeps its DTB receiving unit turned on to receive broadcasts all the time while keeping its display unit turned off. The display unit is turned on when emergency alert signals are received, so that an emergency alert received through DTB is displayed on the mobile station.

This mobile station consumes less power than the above-described model which constantly receives and displays DTB. However, there is a problem in that the newer mobile station still wastes power since the DTB receiving unit is continuously kept turned on regardless of whether there is a disaster or not. Furthermore, the value of disaster information varies greatly depending on whether or not the person who receives the disaster information is affected by that particular disaster. That is, if the location of the disaster is near where the receiver is, the disaster information prompts the receiver to secure his/her personal safety whereas information on a disaster in a faraway place could just be information that has no bearing to the receiver. On the other hand, information on a disaster far from the receiver's current location may cause the receiver to check on his/her family's safety if the disaster is near his/her home. Thus, lack of proper power control with the location of a disaster taken into account lets the mobile station waste power in receiving information that may not be of any value to the user.

This problem is addressed in the following conventional art.

The Japanese Patent application Laid-open No. 2005-051602 discloses a digital broadcast receiver capable of sending a message to a preset emergency contact address upon receiving an emergency alert or the like. The emergency contact address is set in the digital broadcast receiver in advance and, when receiving a broadcast signal, the digital broadcast receiver detects an emergency alert signal or an entitlement management message (hereinafter abbreviated as EMM). The detected emergency alert signal or EMM is converted into an e-mail format and then sent to a server, which transfers the mail from the digital broadcast receiver to a communication terminal. A user carrying the communication terminal in a place away from the digital broadcast receiver can thus check the emergency alert signal or EMM.

However, this digital broadcast receiver too needs to maintain a state capable of receiving an emergency alert all the time even when there is no emergency, and does not have a function of reducing its usual power consumption.

The Japanese Patent application Laid-open No. 2005-117584 discloses a cell phone terminal with a television receiving function that can transfer the contents of a special newscast or the like to another registered cell phone terminal by e-mail without needing to make any functional changes to a broadcast station. The cell phone terminal first extracts a frequency component of an alarm sound from an audio signal outputted from a TV tuner unit, and determines whether or not the level of the extracted frequency component exceeds a preset threshold and matches a certain pattern. Next, the cell phone terminal determines whether or not a signal in scanning lines of a telop area, which is set in advance on a television screen, fits a white signal pattern indicative of emergency information. After recognizing from the decisions that emergency information has been received, the cell phone terminal controls the recording of the television screen and stores the recorded data in a memory. The recorded video data of the emergency information is attached toe-mail, which is then sent to an address registered in advance.

The cell phone terminal with a television receiving function too needs to maintain a state capable of receiving TV broadcasting all the time and does not have a function of reducing usual power consumption of a mobile station.

The Japanese Patent application Laid-open No. 2003-15311 discloses a cell phone that doubles as a DTB receiver and that has solved the problem of competition in MPEG-4 processing between the DTB mode and the cell phone mode. This cell phone has a function of receiving an emergency broadcast through DTB and a function of displaying contents of the emergency broadcast.

However, this cell phone too needs to maintain a state capable of receiving DTB all the time in order to catch an emergency broadcast, and does not have a function of reducing usual power consumption of a mobile station.

The Japanese Patent application Laid-open No. 2004-336227 discloses a mobile station and an emergency broadcast system that enable a user to view and listen to an emergency broadcast delivered in a television signal format in a notification form of his/her choice. The emergency broadcast system sends out an emergency broadcast composed of an announcement broadcast, which preannounces the start of an emergency broadcast, and an actual emergency broadcast, which follows the announcement broadcast. Formats in which the announcement broadcast is delivered include broadcasting by a television broadcast station and e-mail via a basestation for the mobile station. To receive the emergency broadcast, the mobile station is triggered by the reception of the announcement broadcast to prepare for a download of the emergency broadcast, which is transmitted after the announcement broadcast. Upon receiving the emergency broadcast, the mobile station outputs the contents of the received emergency broadcast in a given notification format.

The mobile station has to be always ready to receive the announcement broadcast and, in the case where the emergency broadcast systems ends the announcement broadcast as a television broadcast, the mobile station needs to maintain a state capable of receiving television broadcasting all the time even when there is no emergency. Thus, the mobile station constantly wastes power.

In the case where the emergency broadcast system sends the announcement broadcast by e-mail, on the other hand, the mobile station only has to be in a usual standby state, and accordingly consumes the minimum power.

However, in order to send the announcement broadcast by e-mail to the mobile station that needs to receive the emergency broadcast, a search has to be conducted first for the e-mail address of the mobile station that is in the broadcast area of the emergency broadcast. Then the announcement broadcast has to be sequentially sent by e-mail to every mobile station whose e-mail address has been retrieved by the search. Therefore, it takes long to complete sending the e-mail to every pertinent mobile station, and a total communication data amount is large. Furthermore, the contents of the emergency broadcast has to be converted into character strings or the like according to a given e-mail format, which makes it necessary for base stations and switching stations to have a function for accomplishing the conversion.

From another point of view, of the emergency broadcast system, which is to ensure the reception of the emergency broadcast by the mobile station, is sufficiently fulfilled by simply setting the mobile station to a state capable of receiving the emergency broadcast with the reception of the announcement broadcast as a trigger. Therefore, delivering information such as the contents of the emergency broadcast bye-mail is redundant, and it can be said that the emergency broadcast system is inefficient.

SUMMARY OF THE INVENTION

The present invention was made to solve the foregoing and other exemplary problems, drawbacks, and disadvantages of the conventional structures.

In view of the problems, drawbacks, and disadvantages, a first exemplary feature of the present invention is to provide a broadcast receiving system capable of keeping low the power consumption of a mobile station that receives an irregular broadcast while the mobile station is not receiving the broadcast.

A second exemplary feature of the present invention is to provide a broadcast receiving system capable of keeping low the power consumption of mobile stations for which information on a particular matter of the broadcast is not indispensable by taking into account the contents of the broadcast.

In an exemplary embodiment of the present invention to attain the above and other exemplary purposes, a broadcast receiving system for receiving a broadcast includes: a broadcast station for sending out a first broadcast notice for notifying that predefined contents will be broadcasted; a relay apparatus for monitoring the first broadcast notice sent out from the broadcast station, and sending a second broadcast notice for notifying that the broadcast station has sent out the first broadcast notice; and at least one mobile basestation located within a broadcast coverage of the broadcast station for receiving the second broadcast notice, and transmitting a third broadcast notice for notifying mobile stations located within a mobile coverage of the mobile basestation that the broadcast station has sent out the first broadcast notice; wherein the mobile station having a broadcast receiving unit that is set to a state capable of receiving the predefined contents broadcasted from the broadcast station when the third broadcast notice is received.

In another exemplary embodiment of the present invention to attain the above and other exemplary purposes, the relay apparatus of the broadcast receiving system relays the broadcast notice sent from the broadcast station to the mobile basestation in accordance with the contents of the broadcast notice.

In the present invention, there is an advantage that a user of a mobile station capable of receiving a broadcast does not need to pay any particular attention in order to receive an irregular broadcast. In addition, it is possible to cut the power consumption in usual time when there is no particular matter, such as a disaster or an accident, and to reliably receive a broadcast that is irregular but necessary for the user.

A relay apparatus, the mobile station, a system control method, and a control program of the present invention realizes a broadcast receiving system that is capable of receiving an irregular broadcast while keeping the power consumption of usual time low.

BRIEF DESCRIPTION OF THE DRAWINGS

The above and other exemplary purposes, features and advantages of the present invention will become more apparent from the following detailed description when taken in conjunction with the accompanying drawings wherein.

DESCRIPTION OF THE EXEMPLARY EMBODIMENTS

1. First Exemplary Embodiment

Figure 1:
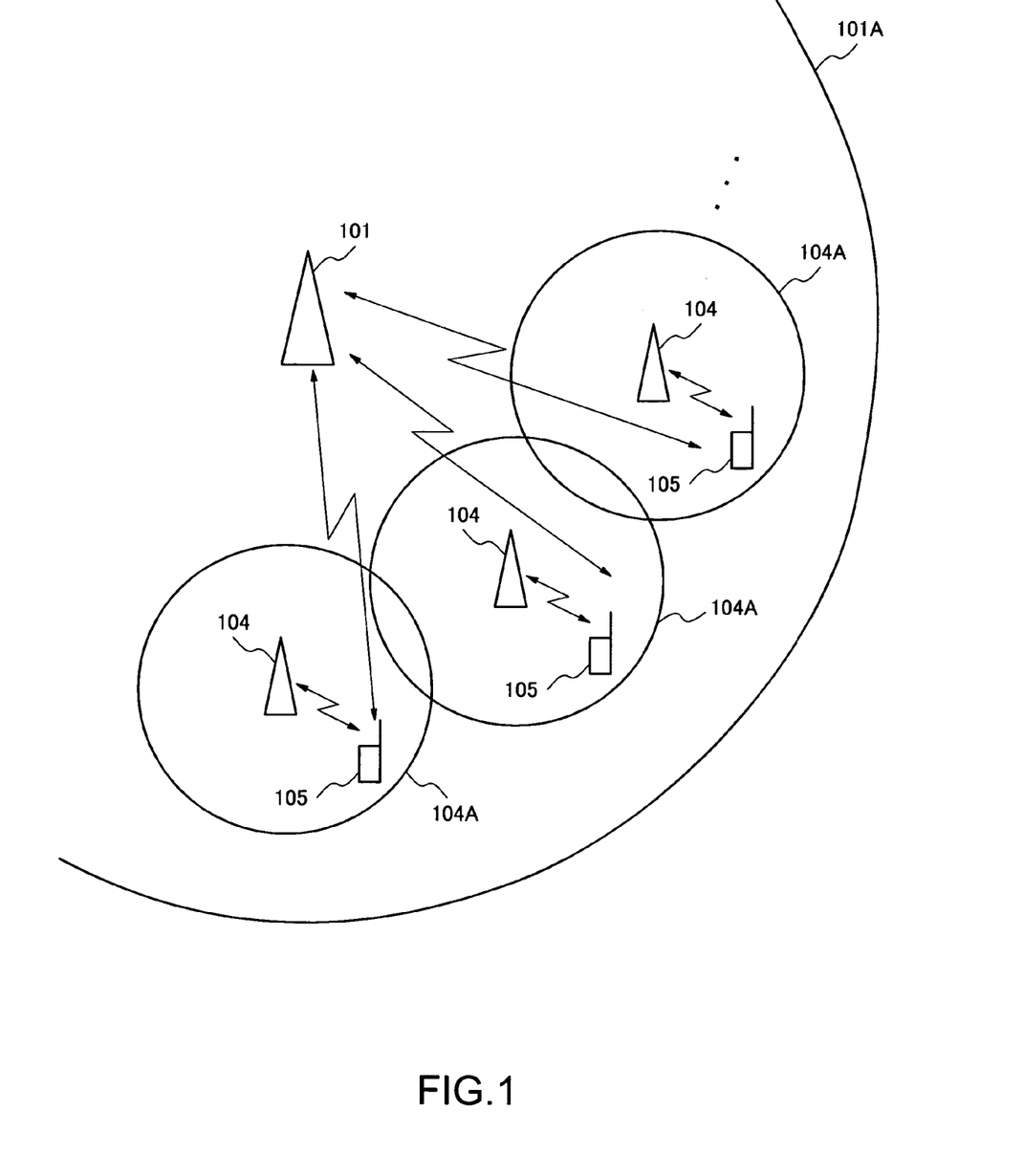
FIG. 1 is a block diagram showing a configuration of an emergency broadcast receiving system according to a first exemplary embodiment of the present invention.

FIG. 1 is a diagram showing a configuration of an emergency broadcast receiving system according to a first exemplary embodiment of the present invention. FIG. 1 shows a relation between speech/data communication by mobile stations and DTB reception by mobile stations in the emergency broadcast receiving system. As shown in FIG. 1, a digital terrestrial broadcasting station (hereinafter abbreviated as DTBSTA) 101 performs DTB, which is received by mobile stations 105. The DTBSTA 101 has a broadcast coverage 101A, which is a certain airwave propagation range. The mobile stations 105 can receive DTB when inside the broadcast coverage 101A.

Plural mobile basestations (hereinafter abbreviated as MBSTA) 104 are within the broadcast coverage 101A. Each MBSTA 104 has a mobile coverage 104A, a certain range in which the MBSTA 104 can communicate with the mobile stations 105. The broadcast coverage 101A is larger than the mobile coverage 104A.

Plural mobile stations 105 are within the mobile coverage 104A. The mobile station 105 is a wireless device mounted to a portable object, which communicates with the MBSTA 104, and receives DTB from the DTBSTA 101.

Figure 2:
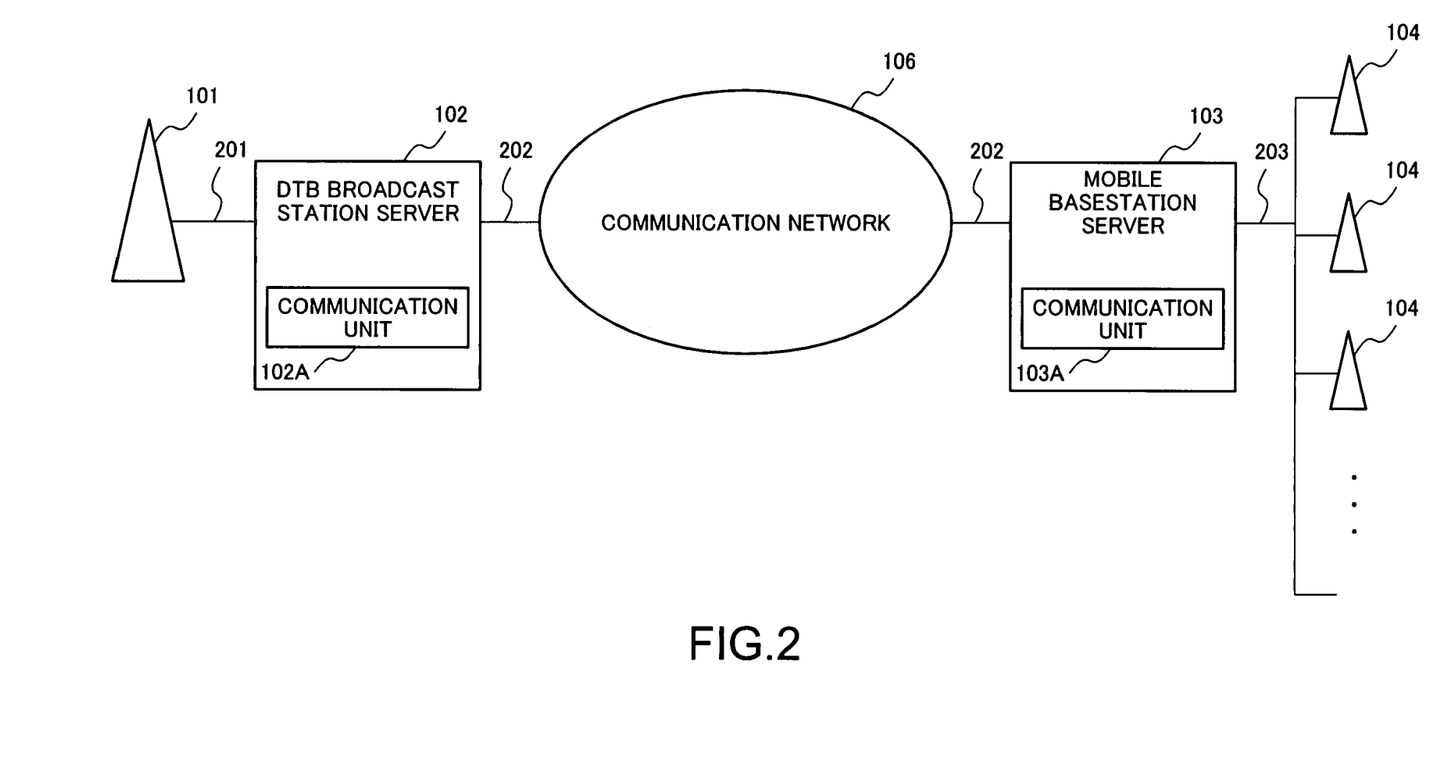
FIG. 2 is a block diagram showing a network configuration of the emergency broadcast receiving system according to the first exemplary embodiment of the present invention.

FIG. 2 is a network configuration diagram of the emergency broadcast system according to the first exemplary embodiment of the present invention. A DTB station server (hereinafter referred to as DTBSTA server) 102 is connected to the DTBSTA 101. The DTBSTA server 102 is connected via a communication network 106 to a mobile base station server (herein after referred to as MBSTA server) 103. The DTBSTA server 102 has a communication unit 102A to communicate with the DTBSTA 101 and the MBSTA server 103. The MBSTA server 103 has a communication unit 103A to communicate with the DTBSTA server 102 and the MBSTA 104.

The DTBSTA server 102 is connected to the DTBSTA 101 and monitors an emergency broadcast notice (hereinafter abbreviated as EBN) 201 sent from the DTBSTA 101. The EBN 201 notifies that DTB is transmitting an emergency broadcast reporting a disaster such as an earthquake, hurricane, tsunami, conflagration, or explosion. After detecting the reception of the EBN 201, the DTBSTA server 102 sends an EBN 202 to the MBSTA server 103 via the communication network 106. Plural MBSTAs 104 within the broadcast coverage 101A are connected to the MBSTA server 103. The MBSTA server 103 receives the EBN 202 and then sends an EBN 203 to each connected MBSTA 104.

Figure 3:
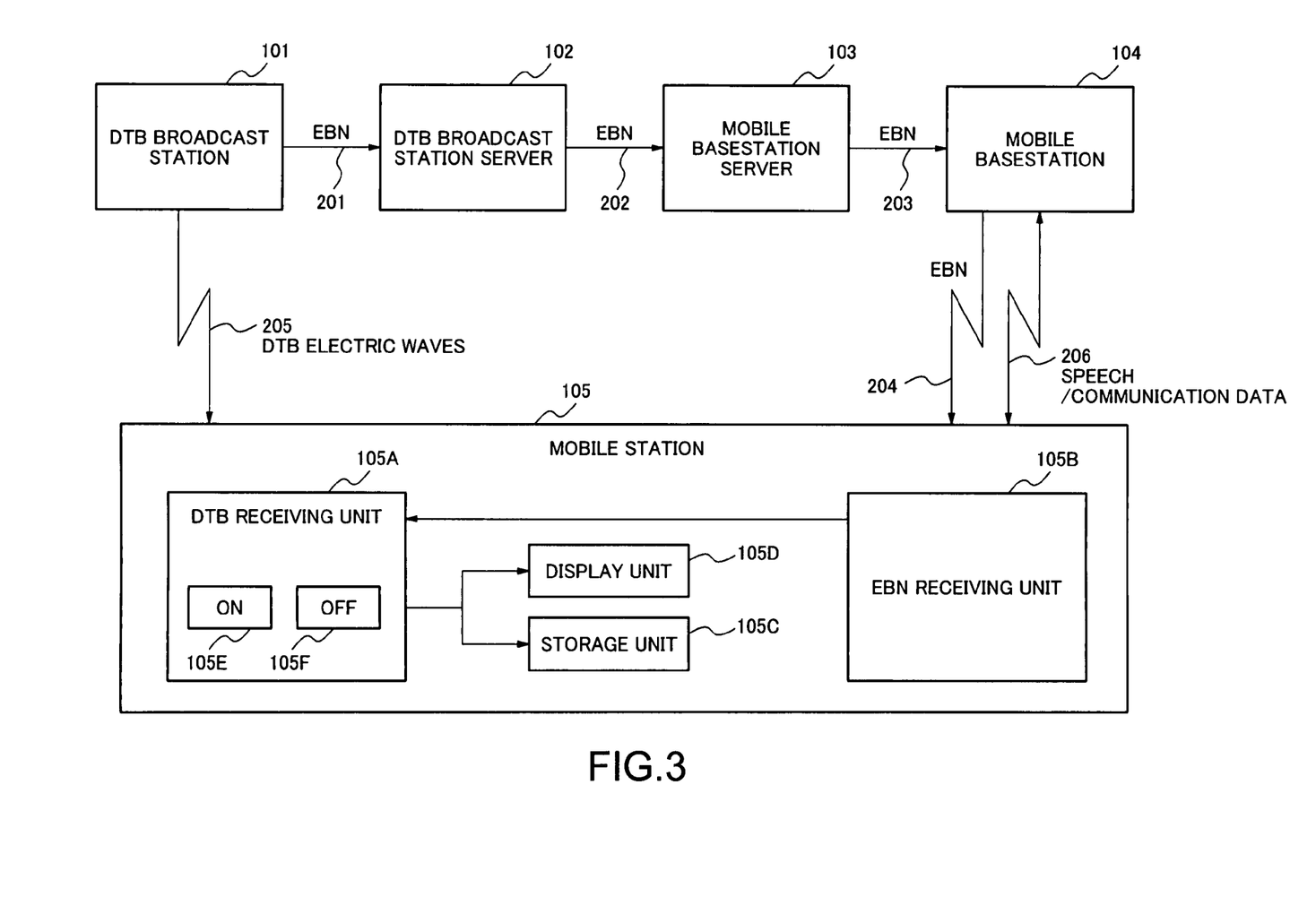
FIG. 3 is a block diagram showing the connection between components of the emergency broadcast receiving system according to the first exemplary embodiment of the present invention, and information transmitted between the components.

FIG. 3 is a block diagram showing the connection between components of the emergency broadcast receiving system according to the first exemplary embodiment of the present invention, and information transmitted between the components. In this emergency broadcast receiving system, the mobile station 105 receives the EBN 201 from the DTBSTA 101 as an EBN 204 via the MBSTA 104. The reception of the EBN 204 triggers the mobile station 105 to receive DTB electric waves 205 that the DTBSTA 101 broadcasts, and store and display the contents of DTB electric waves 205. The above operation is controlled with programs executed by computers inside the respective components. Details will be given below.

The mobile station 105 exchanges speech/communication data 206 with the MBSTA 104 and, when not sending or receiving, waits for an incoming communication from the MBSTA 104. The mobile station 105 has a DTB receiving unit 105A. The DTB receiving unit 105A has an ON-button 105E with which the unit is powered on and an OFF-button 105F with which the unit is powered off. With the press of the ON-button 105E, the DTB receiving unit 105A turns on the power for receiving the DTB electric waves 205 and activates a DTB application to be ready for reception of the DTB electric waves 205. With the press of the OFF-button 105F, the DTB receiving unit 105A turns off the power for receiving the DTB electric waves 205 and shuts down the DTB application to stop receiving the DTB electric waves 205.

Described next is how the mobile station 105 starts to receive the DTB electric waves 205 after receiving the EBN 201 from the DTBSTA 101 as the EBN 204 via the MBSTA 104. The DTBSTA server 102 constantly monitors the EBN 201 sent from the DTBSTA 101. Once detecting the reception of the EBN 201, the DTBSTA server 102 sends the EBN 202 to the MBSTA server 103. The MBSTA server 103 receives the EBN 202 and sends the EBN 203 to the MBSTA 104. Receiving the EBN 203, the MBSTA 104 sends the EBN 204 to the mobile station 105. In this manner, the EBN 201 from the DTBSTA 101 is received as the EBN 204 by the mobile station 105.

The MBSTA 104 can employ various methods in sending the EBN 204 to the mobile station 105. The EBN 204 is desirably sent to all the mobile stations 105 at the same time. This can be achieved by sending the EBN 204 through a channel that is commonly received by every mobile station 105 in the coverage, such as broadcast cannel (BCH) and control channel (CCH) which are employed by common cell phones. The mobile station 105 can thus receive the EBN 204 in a normal standby state. How to send the EBN 204 is not limited to this method, and any method capable of sending information from the MBSTA 104 to the mobile station 105 can be employed to transmit the EBN 204.

The mobile station 105 is provided with an EBN receiving unit 105B in order to receive the EBN 204. The EBN receiving unit 105B receives the EBN 204, turns on the power of the DTB receiving unit 105A for receiving the DTB electric waves 205, and activates the DTB application. The DTB receiving unit 105A then receives the DTB electric waves 205 from the DTBSTA 101 as an emergency broadcast reporting a disaster.

The mobile station 105 is also provided with a storage unit 105C. The storage unit 105C stores the contents of the DTB electric waves 205 received from the DTBSTA 101. The storage unit 105C is capable of making a display unit 105D display the stored contents of the DTB electric waves 205. A user of the mobile station 105 can thus check an emergency alert broadcasted on the DTB electric waves 205 repeatedly at a later time. The display unit 105D is preferably constituted of low-power display panel such as an LCD.

As the DTB receiving unit 105A is powered on and the DTB application is activated, the DTB application controls the display unit 105D to turn on the display unit 105D and display the contents of the received DTB electric waves 205. This enables the user to view in real time the emergency alert broadcasted on the DTB electric waves 205.

Figure 4:
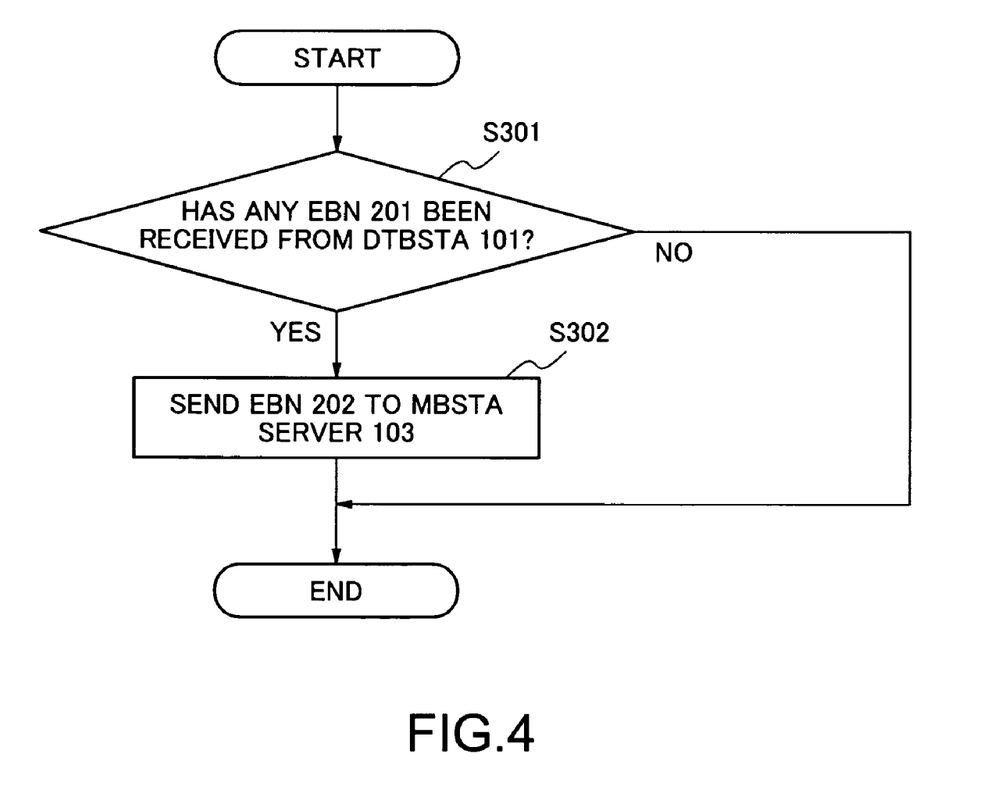
FIG. 4 is a flow chart showing an example of a monitoring operation of a DTB station server of FIG. 3.

FIG. 4 is a flow chart showing an example of the monitoring operation of the DTBSTA server 102. The DTBSTA server 102 monitors the EBN 201 to be received from the DTBSTA 101 (Step S301). When no EBN 201 is received, the processing is ended.

When the EBN 201 is received, the DTBSTA server 102 sends the EBN 202 to the MBSTA server 103 via the communication network 106 and then ends the processing (Step S302).

Instead of constantly monitoring the reception of the EBN 201, the DTBSTA server 102 may make an inquiry to the DTBSTA 101 about whether there is an EBN 201 to be sent or not. The inquiry is desirably made at regular time intervals in order not to delay the reception of an emergency broadcast. The DTBSTA 101 sends the EBN 201 in response to the inquiry made by the DTBSTA server 102. In this way, the DTBSTA server 102 only has to monitor the EBN 201 for a certain period after making the inquiry.

Figure 5:
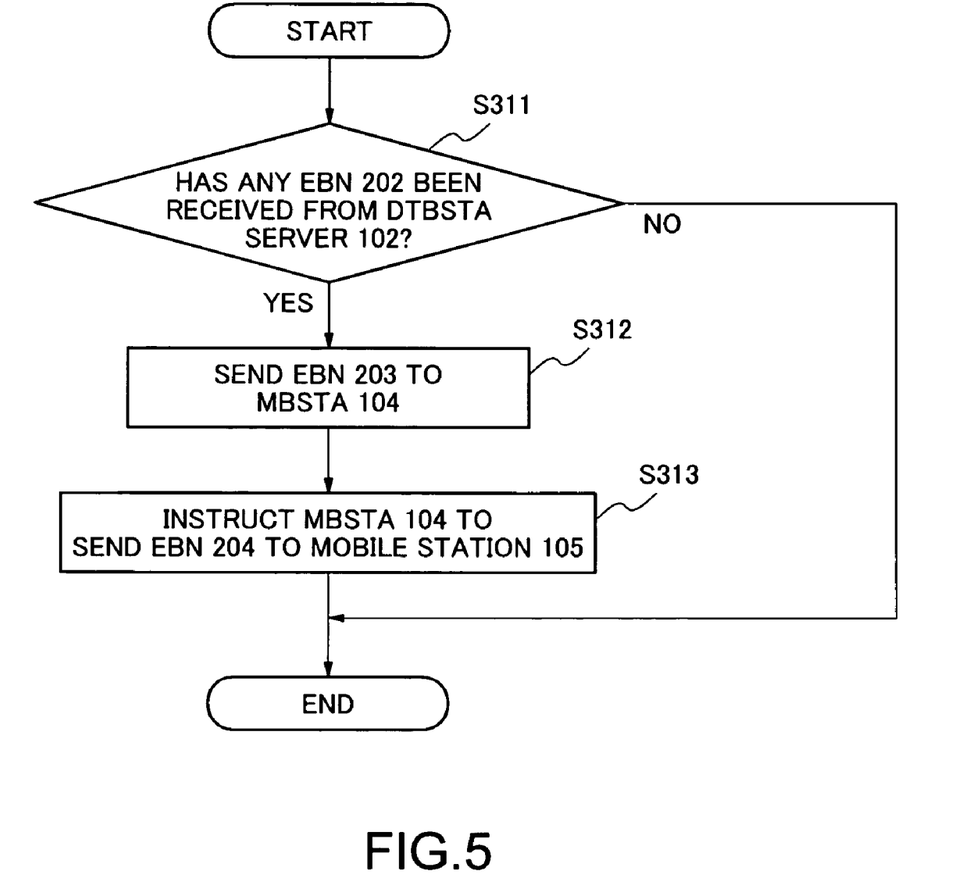
FIG. 5 is a flow chart showing an example of an operation of a mobile basestation server of FIG. 3.

FIG. 5 is a flow chart showing an example of the operation of the MBSTA server 103. The MBSTA server 103 monitors the EBN 202 to be received from the DTBSTA server 102 (Step S311). When no EBN 202 is received, the processing is ended.

When the EBN 202 is received, the MBSTA server 103 sends the EBN 203 to each MBSTA 104 (Step S312). The MBSTA server 103 then instructs each MBSTA 104 to send the EBN 204 to each mobile station 105, and the processing is ended (Step S313).

Figure 6:
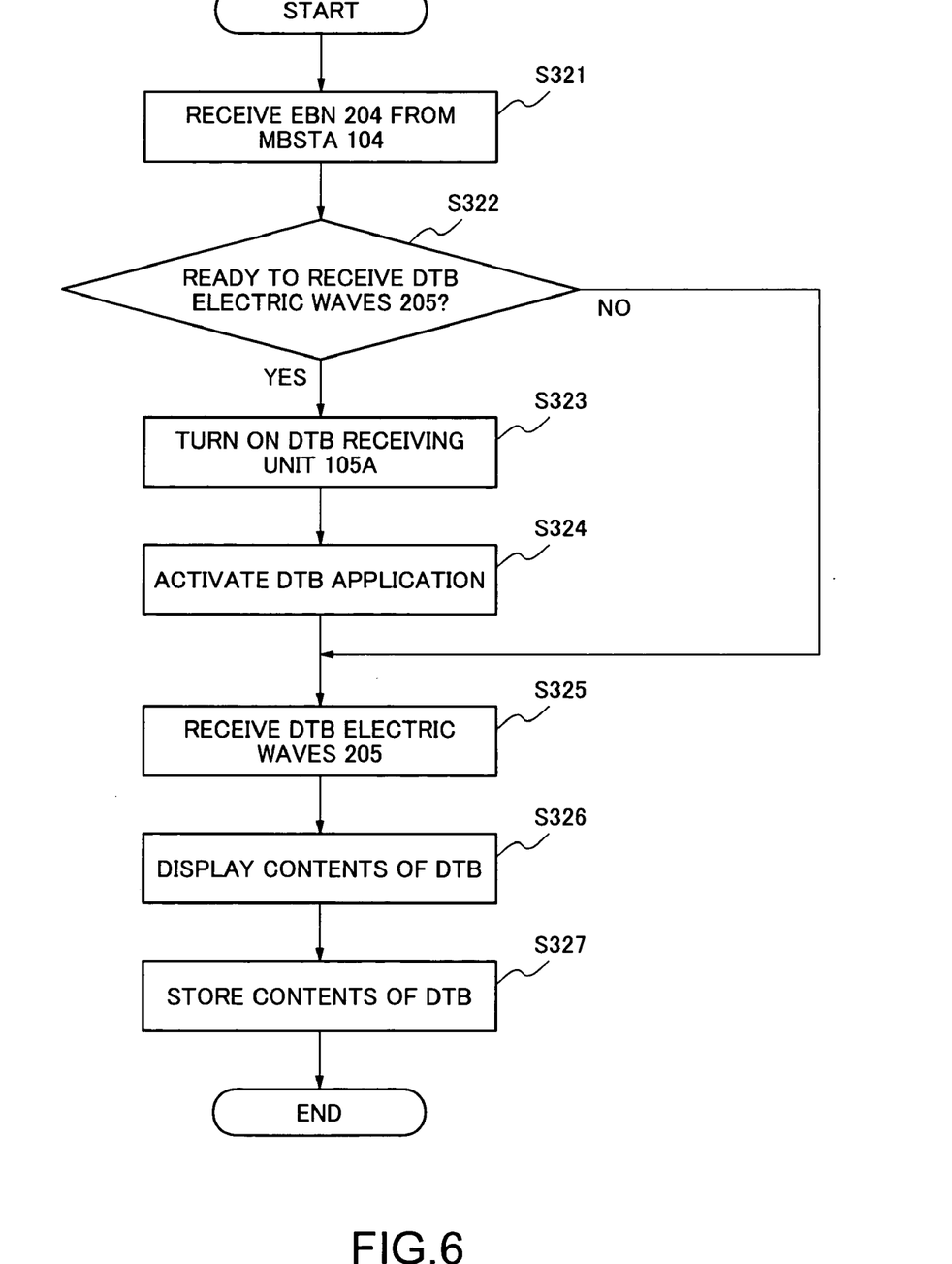
FIG. 6 is a flow chart showing an example of an operation of a mobile station of FIG. 3.

FIG. 6 is a flow chart showing an example of the operation of the mobile station 105. The EBN receiving unit 105B of the mobile station 105 receives the EBN 204 from the MBSTA 104 (Step S321). Upon reception of the EBN 204, the EBN receiving unit 105B checks whether or not the mobile station 105 is in a state ready to receive the DTB electric waves 205 (Step S322).

When the mobile station 105 is not in a state ready to receive the DTB electric waves 205, the EBN receiving unit 105B turns on the power of the DTB receiving unit 105A for receiving the DTB electric waves 205 (Step S323) to ready the mobile station 105 for the reception of the DTB electric waves 205. When the DTB receiving unit 105A is powered on, the DTB application is activated (Step S324). Then the DTB receiving unit 105A receives the DTB electric waves 205 (Step S325). A broadcast delivered on the thus received DTB electric waves 205 contains an emergency broadcast.

The display unit 105D displays the contents of the broadcast delivered on the DTB electric waves 205 to the DTB receiving unit 105A, containing an emergency broadcast (Step S326). The storage unit 105C stores the contents of the broadcast delivered on the DTB electric waves 205 and received by the DTB receiving unit 105A, and the processing is ended (Step S327). The reception of the emergency broadcast on the DTB electric waves 205 and the display and storage of the contents of the broadcast in Steps S325 and S326 are processed by the DTB application.

In the case where the mobile station 105 is in a state ready to receive the DTB electric waves 205 from the beginning, the DTB receiving unit 105A can receive the DTB electric waves 205, in other words, the broadcast containing the emergency broadcast. Therefore, the processing jumps to Step S325.

As has been described, according to the first exemplary embodiment of the present invention, a mobile station capable of receiving DTB can receive an EBN via an MBSTA when an emergency alert is broadcasted. Therefore, there is no need for a user of the mobile station to watch for the reception of an emergency alert broadcast at a usual time, and there is no fear of missing an emergency alert broadcast, either.

In addition, there is no need to keep the mobile station turned on to receive an emergency alert which may or may not be broadcasted at any time. This makes it possible to reduce the power consumption of the mobile station to a minimum level required only for waiting for usual phone calls, data communications and the like. Accordingly, the battery power of the mobile station lasts longer, and the speech/data communication time is prevented from being cut short.

Furthermore, the mobile station can store and display the contents of a received emergency alert broadcast. This enables the user to view an emergency alert broadcast at a later time even if the user cannot watch the broadcast while it is being broadcasted, or to check the broadcast again even if the user watched the broadcast while it is being received.

2. Second Exemplary Embodiment

In the first exemplary embodiment, the MBSTA server 103 sends the EBN 203 to every MBSTA 104 within the broadcast coverage 101A of the DTBSTA 101.

The MBSTA server 103 in a second exemplary embodiment chooses which MBSTA 104 is to become the destination of the EBN 203 in accordance with the disaster type (earthquake, hurricane, tsunami, conflagration, explosion, etc.) and the location of the disaster.

Figure 7:
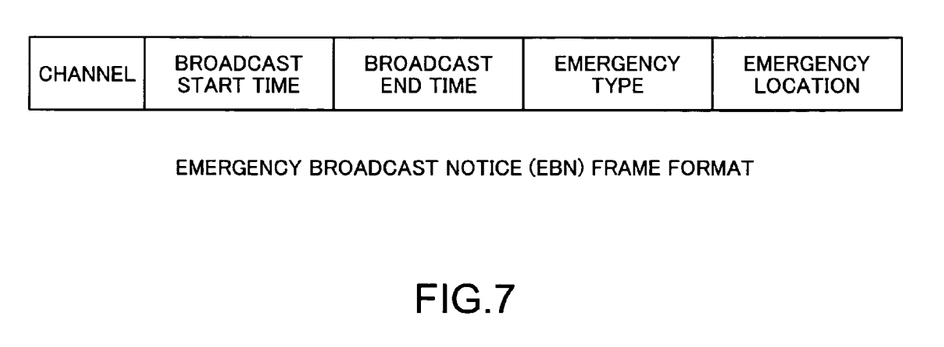
FIG. 7 is a diagram showing an example of a flame format of an emergency broadcast notice.

The EBN in the second exemplary embodiment contains various kinds of information, so that the MBSTA server 103 can choose the MBSTA 104 as the destination of the EBN 203 in accordance with the type and location of the disaster. FIG. 7 shows an example of EBN frame format. The EBN thus contains information such as a channel to be used for the emergency broadcast, broadcast start time, broadcast end time, emergency type, and emergency location. The emergency type is, for example, information indicating the disaster type, that is, a classification such as earthquake, hurricane, tsunami, conflagration, or explosion. The emergency location is information indicating the site where the emergency such as a disaster has occurred by coordinates (latitude and longitude) or by the name of the place. All of the EBNs 201, 202, 203 and 204 transferred between the components employ the format of FIG. 7.

Figure 8:
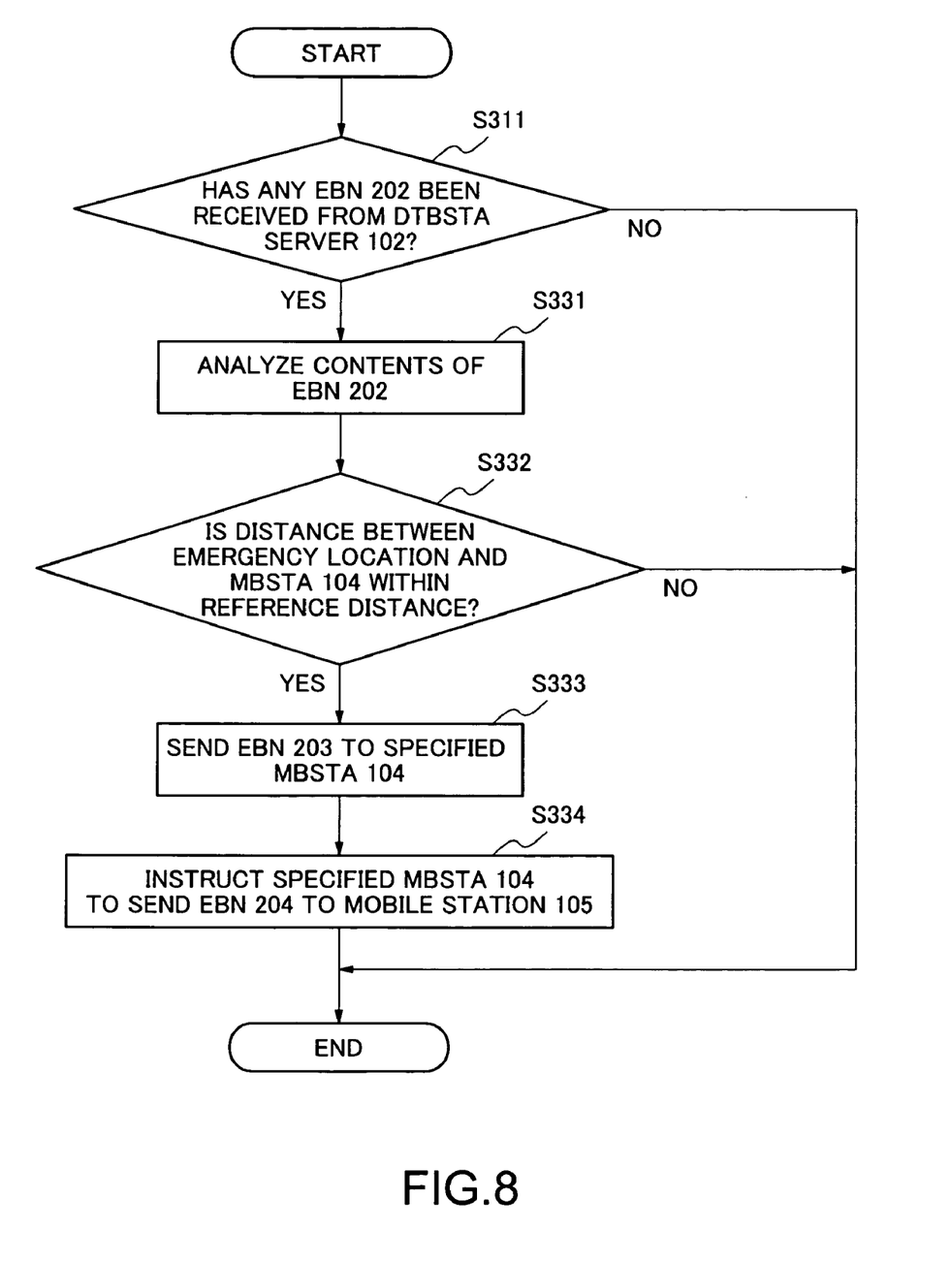
FIG. 8 is a flow chart showing an operation of a mobile basestation server according to a second exemplary embodiment.

As a specific example of how to choose the MBSTA 104 as the destination of the EBN 203, a method that makes selection in accordance with the location of the disaster will be described. FIG. 8 is a flow chart showing the operation of the MBSTA server 103 according to the second exemplary embodiment. The MBSTA server 103 receives the EBN 202 (Step S311) and analyzes the EBN 202 (Step S331). The MBSTA server 103 judges, from the emergency location information within the EBN 202, which area needs to be alerted of the emergency, and chooses to which MBSTA 104 the EBN 203 is to be sent. This exemplary embodiment employs the distance between the emergency location and the MBSTA 104 as the criterion of selection. Specifically, the MBSTA server 103 judges whether or not the distance between the emergency location and the MBSTA 104 is within a reference distance (Step S332). The MBSTA server 103 sends the EBN 203 only to the MBSTA 104 whose distance from the emergency location is determined to be equal to or smaller than the given reference distance (Step S333). The MBSTA server 103 then instructs the thus chosen MBSTA 104 to send the EBN 204 to the mobile station 105 (Step S334).

The reference distance is set taking into account the mobile coverage 104A of the MBSTA 104. In a case where the mobile coverage 104A is a 3-km radius, the reference distance is set to at least 3 km.

It is also effective to vary the reference distance in accordance with the type of disaster in order to adapt to varying ranges which are affected by the disaster depending on the type of the disaster. For instance, the MBSTA server 103 sends the EBN 203 to every MBSTA 104 within the broadcast coverage 101A when the disaster is an earthquake or a hurricane. In short, practically no reference distance is set. When the disaster is a conflagration or an explosion, on the other hand, the MBSTA server 103 sends the EBN 203 only to the MBSTA 104 that is within 2 km from the site of the conflagration or the explosion out of all the MBSTAs 104 that are inside the broadcast coverage 101A. The reference distance is set to at least 5 km in the case where the mobile coverage 104A of the MBSTA 104 is a 3-km radius.

When the disaster is a tsunami, the emergency location should not be considered as a narrow area but a long area of coast. Accordingly, the MBSTA server 103 sends the EBN 203 only to the MBSTA 104 that is, for example, 3 km or less from the coast out of all the MBSTAs 104 that are inside the broadcast coverage 101A. The reference distance is set to at least 6 km in the case where the mobile coverage 104A of the MBSTA 104 is a 3-km radius.

The reference distance may be set more finely by taking into account the geography of the mobile coverage 104A of the MBSTA 104 or the like.

In this exemplary embodiment, the MBSTA server 103 chooses to which MBSTA 104 the EBN 203 is to be sent. Alternatively, the DTBSTA server 102 may determine the MBSTA 104 to send the EBN 203 to. The DTBSTA server 102 in this case sends the EBN 202 to the MBSTA server 103 after adding, to the EBN 202, information specifying which MBSTA 104 to send the EBN 203 to. The same method that is mentioned above can be employed in choosing to which MBSTA 104 the EBN 203 is to be sent.

As has been described, the second exemplary embodiment ensures that each mobile station 105 receives an emergency broadcast that is necessary to the individual mobile station 105 while sending the EBN 203 only to the selected MBSTAs 104. The EBN 203 is sent only to the MBSTA 104 that needs to receive the EBN 203 and not to the one that does not need the emergency broadcast. Therefore, the MBSTA 104 to which the EBN 203 is not sent does not consume power to receive the EBN 203 and send the EBN 204. Moreover, the mobile station 105 within the mobile coverage 104A of this MBSTA 104 does not consume power to receive the EBN 204 and receive the DTB electric waves 205. Thus sending the EBN 203 only to the selected MBSTAs 104 produces an effect of preventing the MBSTA 104 and the mobile station 105 from wasting power. It also produces an effect of reducing communication congestion since fewer EBNs 203 are transmitted.

3. Third Exemplary Embodiment

In a third exemplary embodiment, the DTBSTA server 102 judges from the positional relation between the broadcast coverage 101A and the disaster location whether or not it is necessary to send the EBN 202 to the MBSTA server 103. When a disaster occurs in a place outside of the broadcast coverage 101A, the disaster can be considered as far distant from the mobile station 105, and it's not very necessary for the mobile station to receive an emergency broadcast about the disaster. The DTBSTA server 102 therefore does not send the EBN 202 to the MBSTA server 103 when the EBN 201 is received but the disaster location is outside the broadcast coverage 101A.

Figure 9:
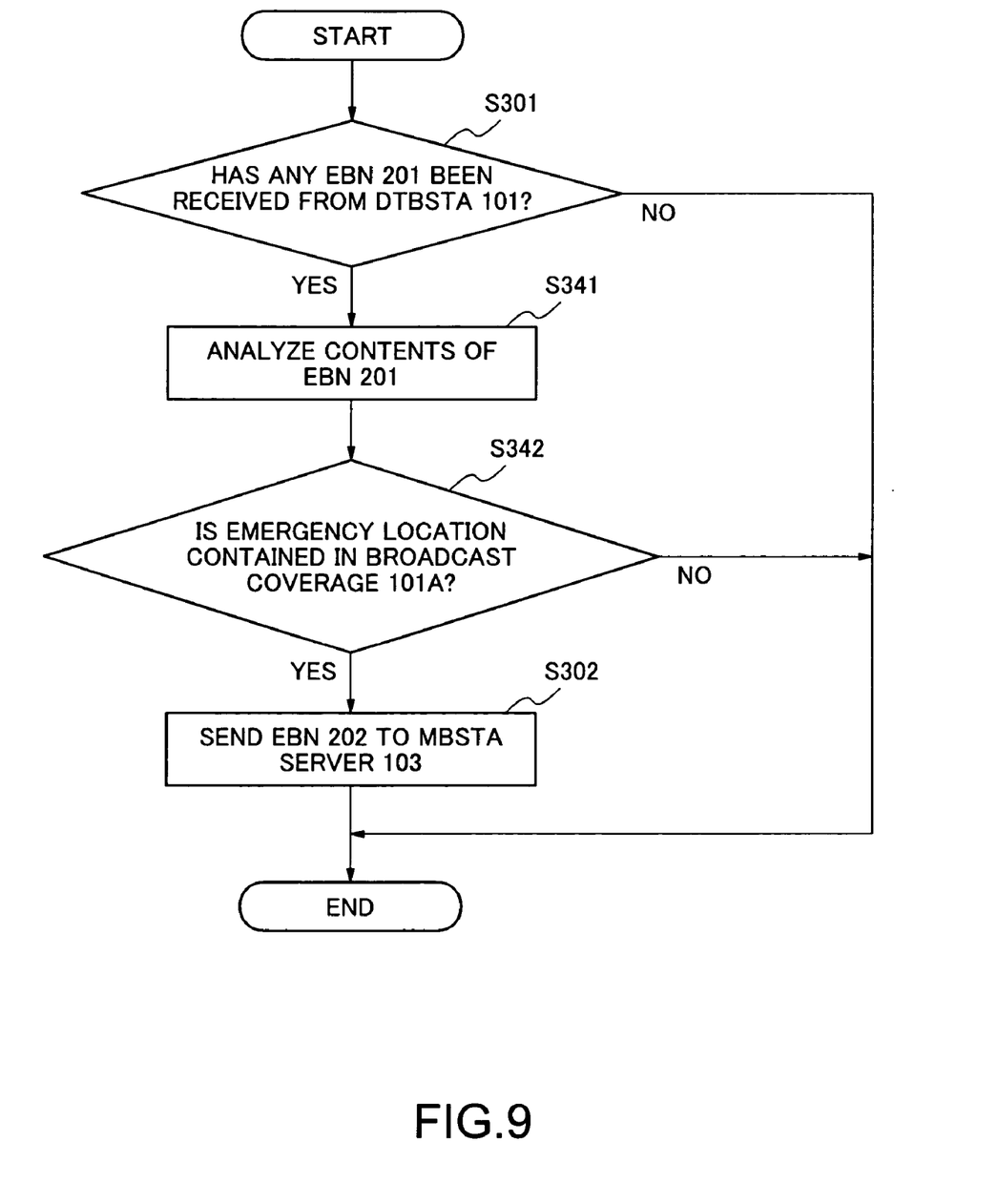
FIG. 9 is a flow chart showing an operation of a mobile basestation server according to a third exemplary embodiment.

The operation of the third exemplary embodiment will be described with reference to FIG. 9, which is a flow chart showing the operation of the DTBSTA server 102 according to the third exemplary embodiment. The DTBSTA server 102 holds information on the location of the DTBSTA 101 in advance. The DTBSTA server 102 receives the EBN 201 (Step S301), and analyzes contents of the EBN 201 (Step S341). The format of the EBN 201 is as shown in FIG. 7. Based on the emergency location information within the EBN 201 and the information on the location of the DTBSTA 101, the DTBSTA server 102 judges whether it is necessary or not to send the EBN 202 to the MBSTA server 103. The criterion of selection is whether the disaster has occurred inside the broadcast coverage 101A or not. For instance, the DTBSTA server 102 judges from the information on the disaster location and the location of the DTBSTA 101 whether or not the distance between the disaster location and the location of the DTBSTA 101 is equal to or smaller than a given reference distance (Step S342). The DTBSTA server 102 sends the EBN 202 only when the emergency location is within the broadcast coverage 101A (Step S302).

As has been described, in this exemplary embodiment, the DTBSTA server 102 judges whether the transmission of the EBN 202 to the MBSTA server 103 is necessary or not, and sends the EBN 202 only when it is necessary. In other words, the MBSTA server 103 receives the EBN 202 only when the MBSTA server 103 needs to receive the EBN 202. Accordingly, the MBSTA 104 following the MBSTA server 103 receives the EBN 203 only when necessary and the further following mobile station 105 receives the EBN 204 only when necessary.

The third exemplary embodiment thus ensures that each mobile station 105 receives an emergency broadcast that is necessary to the individual mobile station 105 while the DTBSTA server 102 carries out the transmission of the EBN 202 to the MBSTA server 103 only when it is needed. In the case where the EBN 202 is not transmitted because the transmission of the EBN 202 is judged as unnecessary, the MBSTA server 103 does not receive the EBN 202. The MBSTA server 103 therefore does not consumes power to receive the EBN 202 and send the EBN 203. Furthermore, because the EBN 203 is not transmitted, the MBSTA 104 does not consume power to receive the EBN 203 and send the EBN 204. The mobile station 105 that is within the mobile coverage 104A of the MBSTA 104 does not consume power to receive the EBN 204 and receive the DTB electric waves 205. This produces an effect of preventing the MBSTA server 103, the MBSTA 104 and the mobile station 105 from wasting power, and also produces an effect of reducing communication congestion since fewer EBNs 203 are transmitted.

Alternatively, it may be the MBSTA server 103 that chooses the MBSTA 104 to send the EBN 203 to. The DTBSTA server 102 always sends the EBN 202 to the MBSTA server 103 upon reception of the EBN 201, and the MBSTA server 103 chooses to which MBSTA 104 the EBN 203 is to be sent. In this case, the MBSTA server 103 uses the emergency location information within the received EBN 202 in selecting the MBSTA 104. Based on the information on the location of the DTBSTA 101 and using the reference distance, the MBSTA server 103 chooses to which MBSTA 104 the EBN 203 is to be sent in the manner described above.

4. Fourth Exemplary Embodiment

In a fourth exemplary embodiment, the MBSTA server 103 chooses to which MBSTA 104 the EBN 203 is to be sent based on the positional relation between the address of the owner of the mobile station 105 and the disaster location. When a disaster occurs in a place within a certain distance from the address of the owner of the mobile station 105, it is very necessary for the owner to receive an emergency broadcast about the disaster. The MBSTA server 103 accordingly sends the EBN 203 to the MBSTA 104 when the disaster location is within a given distance from the address of the owner of the mobile station 105. The positional relation between the disaster location and the location of the MBSTA 104 in which the position registration of the mobile station 105 has been made is not taken into consideration when the MBSTA server 103 selects the MBSTA 104 to which the MBSTA server 103 sends the EBN 203.

Figure 10:
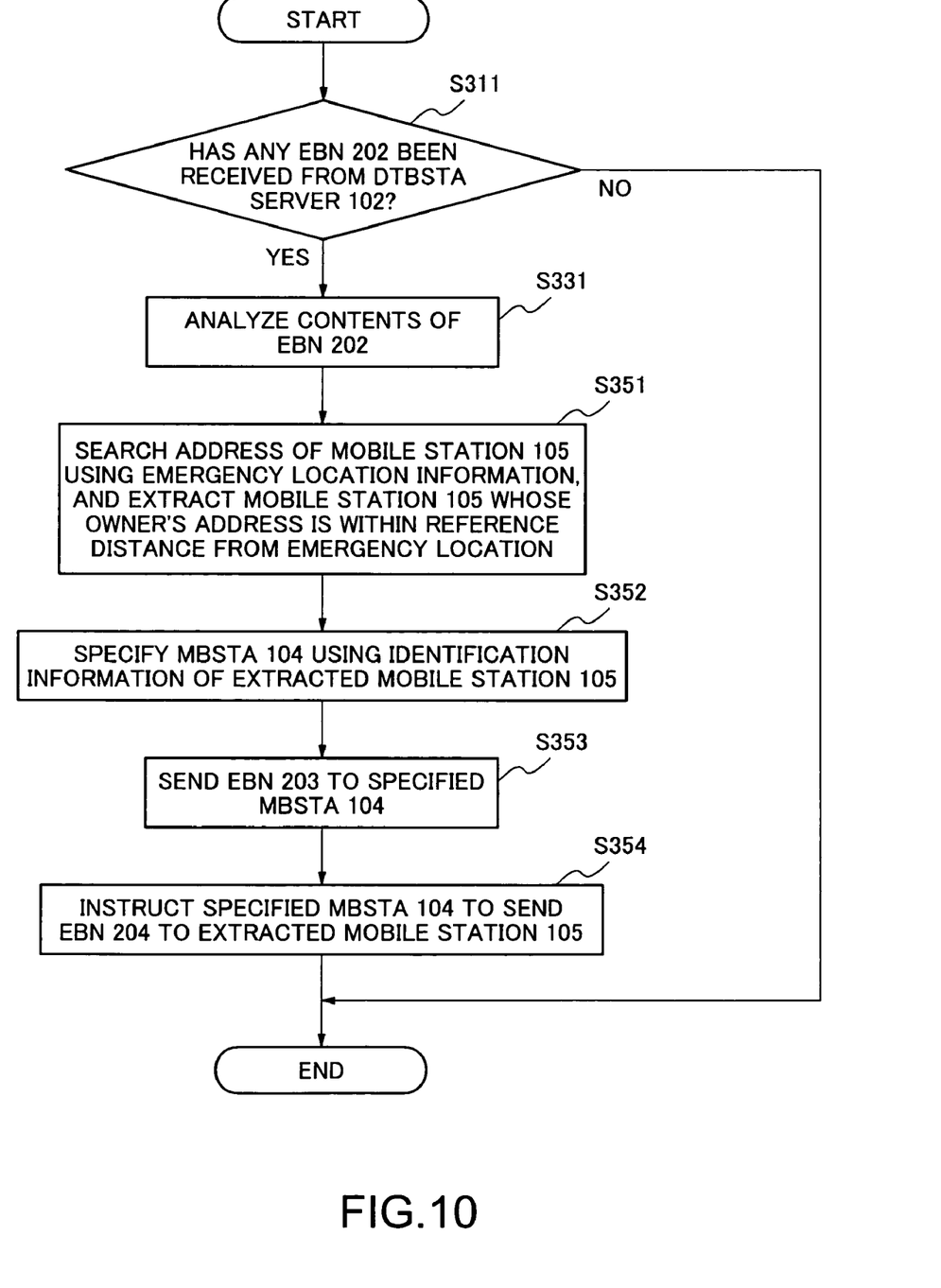
FIG. 10 is a flow chart showing an operation of a mobile basestation server according to a fourth exemplary embodiment.

The operation of the fourth exemplary embodiment will be described with reference to FIG. 10, which is a flowchart showing the operation of the MBSTA server 103 according to the fourth exemplary embodiment. The MBSTA server 103 holds information about the mobile station 105 within the broadcast coverage 101A of the DTBSTA 101 in advance. To be specific, the MBSTA server 103 holds, for each MBSTA 104 which provides the mobile coverage 104A inside the broadcast coverage 101A of the DTBSTA 101, an identification number of the mobile station 105 that is within the mobile coverage 104A of the MBSTA 104 in association with address information of the owner of the mobile station 105. The identification number is sent and received in the position registration of the mobile station 105 within the mobile coverage 104A. The MBSTA 104 sends the identification number to the MBSTA server 103, which makes an inquiry to a separately set database to obtain the owner address information that is associated with the received identification number. The MBSTA server 103 receives the EBN 202 (Step S311), and analyzes the EBN 202 (Step S331). The format of the EBN 202 is as shown in FIG. 7. The MBSTA server 103 next uses the disaster location information contained in the EBN 202 to search the held information on the mobile station 105 and to extract the identification number of the mobile station 105 for which an address near the disaster location has been registered (Step 351). The criterion of selection is whether or not the distance between the disaster location and the address of the owner of the mobile station 105 is equal to or smaller than a reference distance. From the extracted identification number of the mobile station 105, the MBSTA server 103 specifies which MBSTA 104 provides the relevant mobile coverage 104A inside the broadcast coverage 101A (Step S352). The MBSTA server 103 sends the EBN 203 to the specified MBSTA 104 (Step S353). In other words, the MBSTA server 103 sends the EBN 203 only to the MBSTA 104 in which the mobile station 105 whose owner's address is within the reference distance from the disaster location has made position registration. The MBSTA server 103 then instructs the specified MBSTA 104 to sends the EBN 204 only to the extracted mobile station 105 (Step S354).

How to send the EBN 204 only to the extracted, specific mobile station 105 is not limited to a particular method. It is sufficient if a signal containing the identification number of the target mobile station 105 is transmitted as in paging for usual call. When there are plural target mobile stations 105, a multicast transmission containing their respective identification numbers is employed.

As has been described, the fourth exemplary embodiment ensures that the an emergency broadcast is received by the mobile station 105 that needs to receive the emergency broadcast while choosing to which mobile station 105 the EBN 204 is to be sent. In other words, the owner of the mobile station 105 can reliably receive a necessary emergency broadcast through the mobile station 105 when the owner is away from home and a disaster occurs near the address of the owner.

The EBN 204 is sent only to the selected mobile stations 105, so the one that does not need to receive the EBN 204 consumes no power to receive the EBN 204 and receive the DTB electric waves 205. Furthermore, the EBN 203 is not sent to the MBSTA 104 whose mobile-coverage 104A does not contain the mobile station 105 to which the EBN 204 has to be sent. This MBSTA 104 therefore does not consume power to receive the EBN 203 and send the EBN 204. This produces an effect of preventing the MBSTA 104 and the mobile station 105 from wasting power, and also produces an effect of reducing communication congestion since fewer EBNs 203 are transmitted.

The fourth exemplary embodiment employs the address of the user of the mobile station 105 but other places may be used instead. That is, position information other than the user's home address may be registered in advance in the MBSTA server 103, when the distance between the registered place and the disaster location is within the reference distance, the mobile station 105 can receive the EBN 204.

5. Fifth Exemplary Embodiment

The first through fourth exemplary embodiments have been described on the premise that the EBN 204 is received while the mobile station 105 is in a standby state.

This invention can be carried out also when the mobile station 105 is during speech/data communication. In a fifth exemplary embodiment, processing for receiving an emergency broadcast breaks into speech/data communication processing when the EBN 204 is received from the MBSTA 104 during speech/data communication. In other words, when the EBN receiving unit 105B receives the EBN 204 while the mobile station 105 is in a speech/data communication state, the DTB receiving unit 105A is turned on and the DTB application can, be activated.

In the case where the mobile station 105 is being engaged in a phone call or a data communication and the reception and display of the contents of the DTB electric waves 205 are not desirable, the DTB electric waves 205 does not always need to be received immediately. For instance, the mobile station 105 may sound an alarm or flash a warning light when the EBN receiving unit 105 receives the EBN 204, thereby prompting the user to make the DTB receiving unit 105A ready for reception.

As has been described, in the fifth exemplary embodiment, processing for receiving an emergency broadcast breaks into speech/data communication processing when the mobile station 105 is in a speech/data communication state. Alternatively, the mobile station 105 merely notifies the user of the reception of the EBN 204. The reception of the EBN 204 and the reception of DTB containing an emergency broadcast are thus ensured even when the mobile station 105 is engaged in a speech/data communication. This eliminates the need for the mobile station 105 to be in a DTB receiving state in usual time, and produces an effect of preventing the mobile station 105 from wasting power to receive an emergency broadcast when there is no emergency.

In the first through fifth exemplary embodiments, while this invention has been described in connection with digital terrestrial broadcasting (DBT), it is to be understood that "broadcast" in the present invention contains any technologies to transmit or distribute contents or programs to a number of recipients over some media. "Broadcast" contains not only ordinary television and radio, but also wire broadcast, "webcasting" such as broadcast over the Internet and other transmission technologies for a number of recipients using some media. And the MBSTA server may be contained in each MBSTA, and the DTBSTA server may be contained in the MBSTA server.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

This application is based on Japanese Patent Application No. 2005-193341 filed on Jul. 1, 2005, and including specification, claims, drawings and summary. The disclosure of the above Japanese Patent Application is incorporated herein by reference in its entirety.

What is claimed is:

1. A broadcast receiving system for receiving a broadcast, comprising:
   a broadcast station for sending out a first broadcast notice for notifying that predefined contents will be broadcasted;
   a relay apparatus for monitoring the first broadcast notice sent out from the broadcast station, and sending a second broadcast notice for notifying that the broadcast station has sent out the first broadcast notice; and
   at least one mobile basestation located within a broadcast coverage of the broadcast station for receiving the second broadcast notice, and transmitting a third broadcast notice for notifying mobile stations located within a mobile coverage of the mobile basestation that the broadcast station has sent out the first broadcast notice;
   at least one mobile station having a broadcast receiving unit, normally powered off, which can receive predefined contents broadcasted from the broadcast station, and a broadcast notice receiving unit which receives the third broadcast notice from the mobile basestation,
   wherein, when the third broadcast notice is received, the broadcast notice receiving unit turns on electric power to the broadcast receiving unit so that the broadcast receiving unit can receive the predefined contents from the broadcast station,
   wherein the relay apparatus selectively sends the second broadcast notice to the mobile basestation in accordance with the contents of the first broadcast notice,
   wherein the first broadcast notice includes information of an emergency location which indicates a place where the emergency has occurred; and
   wherein the relay apparatus sends the second broadcast notice selectively to the mobile basestation in accordance with the emergency location.

2. The broadcast receiving system according to claim 1, wherein the first broadcast notice includes information of an emergency location which indicates the place where the emergency has occurred; and wherein the relay apparatus sends the second broadcast notice selectively to the mobile basestation in the context of both locations of the emergency location and a location of the mobile station.

3. The broadcast receiving system according to claim 2, wherein the relay apparatus sends the second broadcast notice selectively to the mobile basestation in a case where a distance between the emergency location and the location of the mobile station is within a predetermined distance.

4. The broadcast receiving system according to claim 1, wherein the relay apparatus sends the second broadcast notice to the mobile basestation only when the emergency location is within the broadcast coverage.

5. A broadcast receiving method for receiving predefined contents broadcasted from a broadcast station by at least one mobile station having a capability of receiving the broadcast contents, the method comprising:
   monitoring and receiving a first broadcast notice for notifying that the predefined contents will be broadcasted from the broadcast station;
   sending a second broadcast notice for notifying, that the broadcast station has sent out the first broadcast notice, to at least one mobile basestation located within a broadcast coverage of the broadcast station;
   transmitting a third broadcast notice from the mobile basestation, which has received the second broadcast notice, for notifying a mobile station having a broadcast receiving unit, normally powered off, the mobile station located within a mobile coverage of the mobile basestation that the broadcast station has sent out the first broadcast notice;
   when the mobile station receives the third broadcast notice from the mobile basestation, turning on electric power to the broadcast receiving unit in the mobile station so that the broadcast receiving unit can receive the predefined contents from the broadcast station; and
   setting the mobile station, which has received the third broadcast notice, to a state capable of receiving the predefined contents broadcasted from the broadcast station,
   wherein the step of sending the second broadcast notice includes the step of sending the second broadcast notice selectively to the mobile basestation in accordance with the contents of the first broadcast notice,
   wherein the first broadcast notice includes information of an emergency location which indicates a place where the emergency has occurred; and
   wherein the step of sending the second broadcast notice includes the step of sending the second broadcast notice selectively to the mobile basestation in accordance with the emergency location.

6. The broadcast receiving method according to claim 5, wherein the first broadcast notice includes information of an emergency location which indicates the place where the emergency has occurred; and
   wherein the step of sending the second broadcast notice includes the step of sending the second notice selectively to the mobile basestation in the context of both locations of the emergency location and a location of the mobile station.

7. The broadcast receiving method to claim 6, wherein the step of sending the second broadcast notice includes the step of sending the second broadcast notice selectively to the mobile basestation in a case where a distance between the emergency location and the location of the mobile station is within a predetermined distance.

8. The broadcast receiving method according to claim 5, wherein the step of sending the second broadcast notice includes the step of selectively sending the second broadcast notice to the mobile basestation only when the emergency location is within the broadcast coverage.

* * * * *